May 8, 1962 F. SCHLEICH ETAL 3,033,974
METHOD AND MEANS FOR WELDING AND SOLDERING WITH THE
HELP OF BEAMS OF CHARGED PARTICLES
Filed June 29, 1959 4 Sheets-Sheet 1

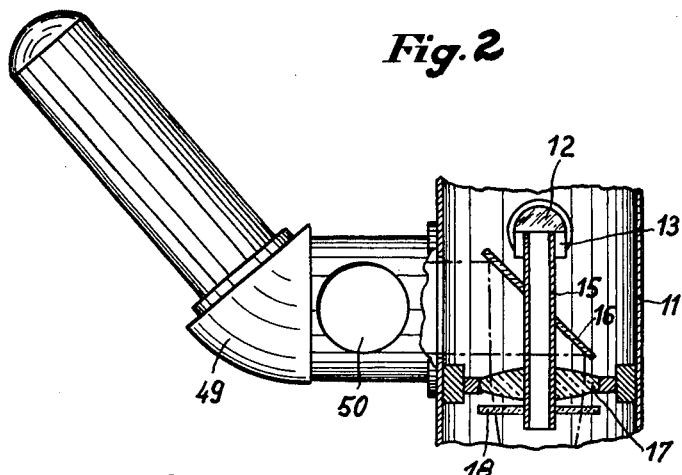
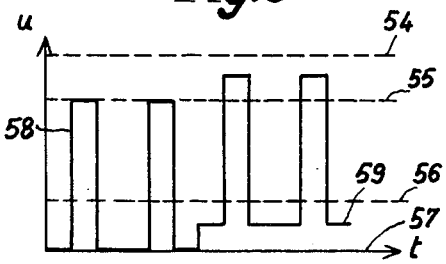
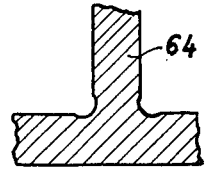
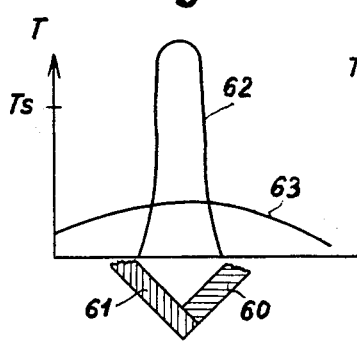
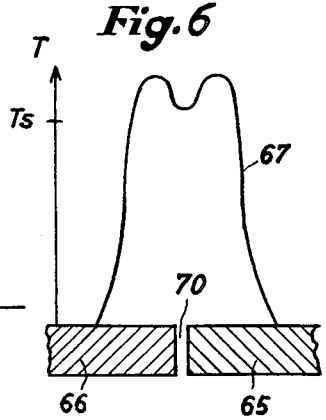

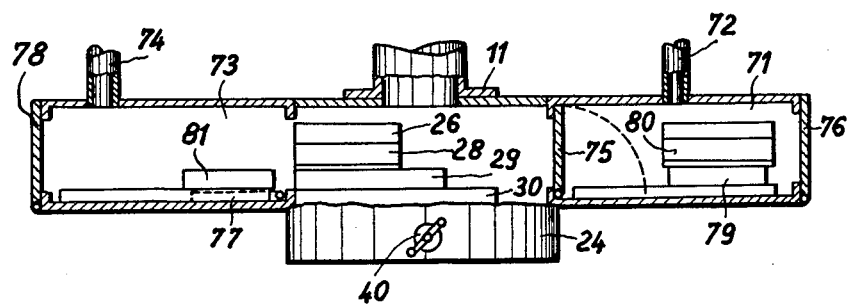
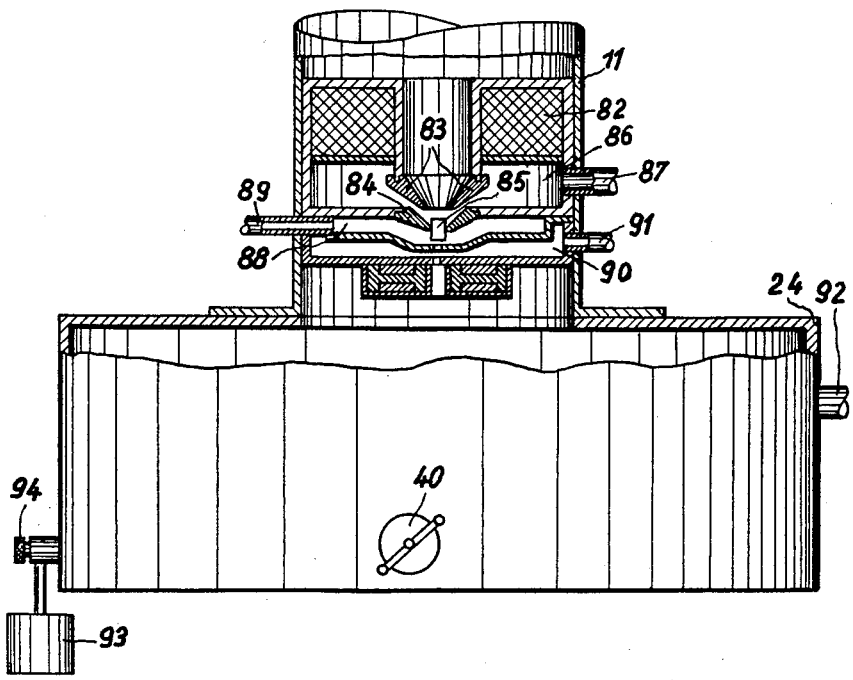

3,033,974
METHOD AND MEANS FOR WELDING AND SOLDERING WITH THE HELP OF BEAMS OF CHARGED PARTICLES
Fritz Schleich, Unterkochen, Wurttemberg, and Karl Heinz Steigerwald, Heidenheim (Brenz), Wurttemberg, Germany, assignors to Carl Zeiss, Heidenheim (Brenz), Wurttemberg, Germany
Filed June 29, 1959, Ser. No. 823,783
Claims priority, application Germany July 1, 1958
4 Claims. (Cl. 219—117)

This invention relates to welding and soldering, and more particularly, to an improved method and means for welding and soldering using a controlled beam of charged particles.

When welding is done by means of a source of energy which applies the energy to the surface of the material to be welded for example, when welding is done by means of a flame, by means of an electric arc, by means of electrodes, etc., the surface is heated directly by the source of energy whereby, however, it is very difficult to eliminate contamination of the welded material.

It has also been proposed to use an electron beam as means for supplying the necessary energy in the welding of special materials such as e.g. of zirconium. This welding operates in a vacuum so that contamination of the welded material is eliminated.

The said welding process has the disadvantage that the material in the vicinity of the impinging area of the beam is strongly heated to a rather large extent, since the thermal energy in the material is propagated practically uniformly in all directions by heat conduction.

The high temperature of the material in the vicinity of the impinging area of the beam has a disadvantageous effect upon the mechanical properties of the welded material and entail most of all a very undesirable buckling of the welded objects.

A further disadvantage of the known welding process consists in that it is very difficult to attain any effect in depth, i.e. the material molten by the impinging beam does not penetrate the welding to sufficient depth.

Another disadvantage of the known welding processes resides in that the propagation of energy by heat conduction in the material is comparatively slow so that only small welding speeds can be obtained.

It is, therefore, one object of this invention to provide an improved method and means for welding and soldering material in which only a small region of the material adjacent the weld is subjected to heat stress and in which the weld is deep.

It is a further object of this invention to provide improved method and means for welding material at high speed in which the heat conductivity of the material does not seriously limit weld speed.

In the welding or soldering process according to the present invention, a beam of charged particles is used as means for applying energy, whereby, according to the invention the intensity of said beam is controlled intermittently during the entire working process, the energy density of the beam impinging upon the material during each impulse being sufficient to melt the material of the impinged zone and to overheat the molten material, the duration of the intervals between successive pulses being sufficient to allow cooling of the molten material to a desired temperature value before the start of the next impulse.

In order to minimize the thermal effect on the surrounding material and the vaporization of the molten and overheated material, it is necessary to use extremely short pulses of a duration of $10^{-3}$ to $10^{-6}$ sec. In order to obtain a good weld, it is further necessary to make the intervals between successive pulses as large as possible. The duration of these intervals corresponds thereby to at least the 5 to 10 fold pulse duration and may be even larger.

The beam of charged particles is so controlled and focussed that during the pulse duration the greatest possible energy density of the beam of charged particles impinging on the object to be worked is achieved. This beam melts the impinged small area of material and very much overheats the molten metal. Since the pulse duration is kept very short, no unduly high heat flow propagates to the marginal zones from said impinged area and no unduly large vaporization of the overheated material occurs. During the pulse intervals owing to being highly fluid, the overheated material enters well into the capillaries and pores of the material to be welded and thereby quickly heats the adjacent material up to a temperature value where a fusion takes place.

With the new welding process it is possible to overheat the impinged material so much that it can heat a multiple amount of the adjacent material up to a temperature value where fusion occurs before it is cooled to the melting temperature.

Owing to the intensive beam of charged particles, a push effect is exerted in addition on the particles of the material which has the effect that the overheated material enters chiefly into the material in the direction of the beam. Accordingly, comparatively large penetration depths are obtainable with the new welding process. Thereby, as well as by the overheating of the material by the beam, comparatively high welding speeds can be obtained, i.e. the material can be moved quickly with respect to the beam without the welding becoming irregular and discontinuous.

The aforesaid penetration of the molten material into the capillaries and pores of the material to be welded can be unequivocally demonstrated in a metallurgical section image through a welded part. From such an image it can be shown that after completion of the weld border zones are no longer visible i.e. therefore, that the materials to be united have entered into an intimate union with each other. This union is not limited to a region near the surface but reaches into considerable depths not previously attainable.

For producing a flange butt-welding joint or a butt-welding it is advantageous to deflect the beam of charged particles in such a way that it impinges alternately first upon the one and then on the other of the two parts to be united during subsequent impulses wherein the said materials are moved in the direction of the seam during the welding operation. In this way it is possible to attain the best temperature distribution for the welding process.

If a closing seam e.g. a circular seam is welded with pulses of constant duration and amplitude, it happens that the seam is wider at its end than at its beginning. This is due to the overall temperature of the material slowly increasing in the course of the welding process. In order to avoid this effect and to obtain a welding seam of uniform width the duration of the pulses or the pulse frequency should be so changed that the input energy at the end of the welding is smaller than at the beginning.

In the examples so far described the weld was produced without the addition of any extra material. It is, however, also possible with the method according to the invention to perform a welding process with the addition of extra material. Therein transport devices operating within the vacuum are with advantage provided which bring the extra material to the welding point.

Similarly it is possible with the method according to the invention to solder materials with low melting points. Here also the solder material is with advantage brought to the soldering point by suitable transport devices.

In certain cases it may, however, also be advantageous to lay the extra material into the seam of the materials to be united before the start of the welding or soldering process.

The new method also permits the performance of "spot-welding" at high speed. For this purpose the beam of charged particles or the material to be welded are so moved in the intervals between the impulses that subsequent beam impulses impinge upon different areas of the material. If no special demands are made upon the tightness of the material welded then it is not necessary in the said case to limit the intensity of the beam of charged particles a priori. More particularly the beam of charged particles may in the said case penetrate the materials to be united wherein so much material is melted that welding takes place. The resulting bond may be considered somewhat similar to hollow-type rivets.

A device for performing the method according to the invention contains according to the invention a beam-producing system fitted with a long-focus cathode, an electron-optical lens for focussing the electron beam upon the object to be worked, a deflecting system arranged behind the said lens as seen in the direction of the beam, an optical observation device arranged between the electron-optical lens and the beam-producing system for the purpose of observing the working area, and a cross-slide carrying the object to be worked upon. Furthermore, said device comprises an impulse generator fundamentally of prior art for the purpose of producing control impulses and circuitry for applying the said impulses to the beam-producing system.

Owing to the shortness of the control pulses it is necessary to direct these pulses directly to the beam producing system. In this connection all transmitting means must have a sufficiently large band width and very small time constants. This is best achieved by using a pulse-isolating-transformer which transforms the control pulses generated by a grounded generator to the high voltage potential of the beam producing system and which feeds these pulses to this system.

By the use of a long-focus cathode it is attained that a highly intense beam can be focussed upon the object to be worked upon even without the use of additional electron-optical lenses. The use of an additional electron-optical lens has the advantage that extremely fine focussing may be attained as it is for instance required for the welding of thin metal sheets.

In order to obtain a welding seam as uniform as possible it is advantageous to use an electric motor controllable in its speed of rotation for the purpose of shifting the cross slide in a coordinate direction coinciding with the direction of the welding seam. Thereby it is advantageous to equip the cross slide with terminal position switches which automatically change over the direction of rotation of the motor after the terminal positions have been reached so that the seam is gone over several times if required with alteration of the beam focussing or the beam deflection.

If there exists the postulate that the welding is to be performed not in a high vacuum but in the presence of a protective gas the device according to the invention is modified in so far that between the working space and the beam-production space a system of pressure stages fundamentally of prior art is arranged. In certain cases it may also be advantageous to provide instead of the pressure stages one intermediate pressure chamber which contains moveable devices fitted with bores between the apertures of the spaces. The beam of charged particles is therein switched on by means of a control device as soon as the spaces are in communication.

For the purpose of avoiding the relatively large loss of time entailed by the removal of the finished object and the introduction of a new object after opening of the device it is advantageous to provide vacuum locks which allow the said procedures to be carried out without disturbance of the high vacuum.

The invention is explained in greater detail by way of the embodiments illustrated in the accompanying drawing, in which:

FIG. 2 is a partial section through the device of FIG. 1 taken along the line II—II;

FIG. 3 shows the voltage relations in the beam-producing system;

FIG. 4 shows the temperature distribution over a work piece to be welded;

FIG. 5 is an image of a cross section of an attaching weld produced according to the invention;

FIG. 6 is the temperature distribution over a weld (butt weld);

FIG. 8 shows a lock device for sluicing-out finished and for sluicing-in new objects in schematic representation;

FIG. 9 shows a partial view of a device for welding or soldering by means of a beam of charged particles in which a system of pressure stages is used;

Figure 1:
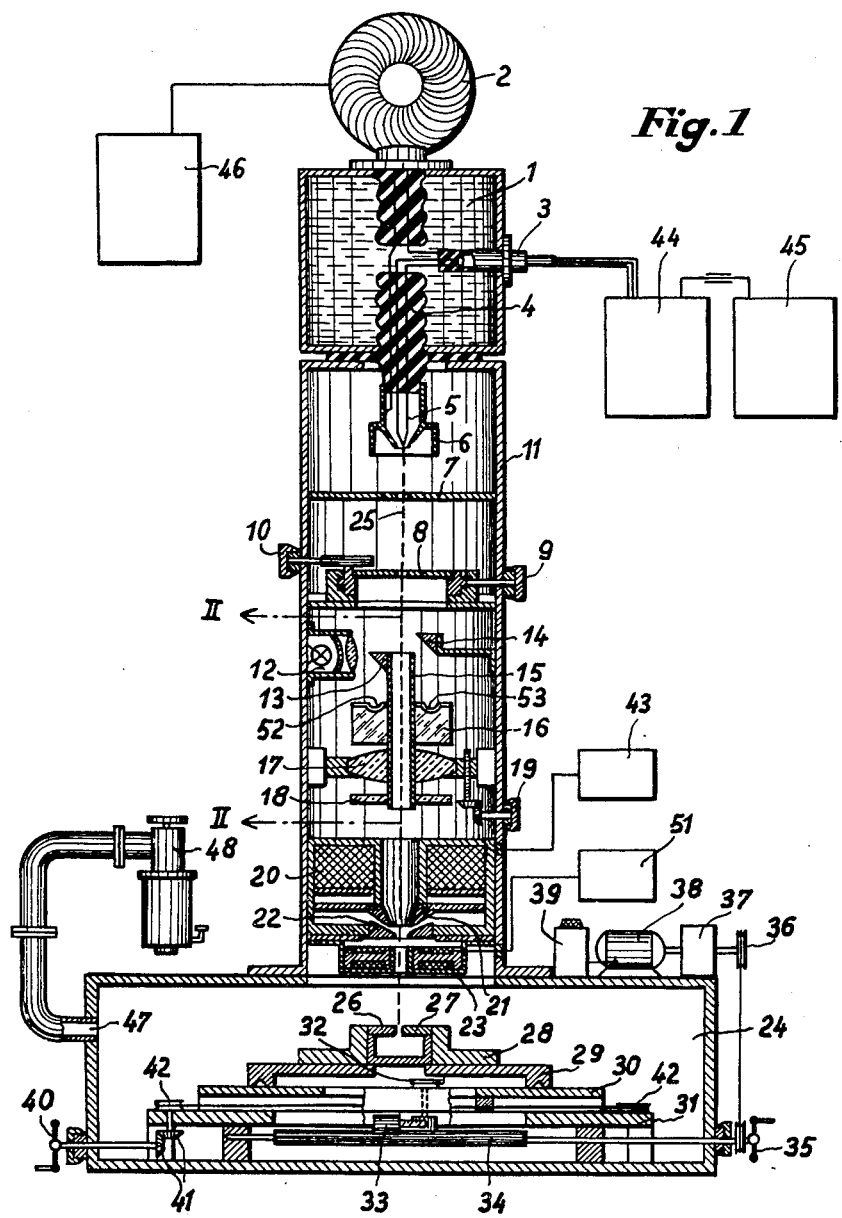
FIG. 1 shows a device according to the invention for welding or soldering by means of an electron beam, drawn in section.

In FIG. 1 an oil-filled container is designated by 1 and upon it is arranged an impulse-insulating transformer 2 an insulating attachment of which dips into the said container. Also into the container 1 there dips a three-cored high-voltage cable 3 as well as a further insulating attachment 4. Through the insulating attachment 4 there pass the leads for feeding the heating voltage to the cathode 5 and for applying the voltage to the Wehnelt cylinder 6. Below the Wehnelt cylinder 6 the grounded anode 7 is represented.

In the device 45 a high voltage of say 100 kv. is produced and fed into the device 44 by means of a high-voltage cable fitted with a grounded outer sheath. This device 44 serves to produce the adjustable heating voltage and the adjustable voltage for the Wehnelt cylinder. The said voltages are led into the oil-filled container 1 by the three-cored high voltage cable 3 fitted with a grounded sheath. The heating voltage which may for instance be at −100 kv. is fed directly to the cathode 5. The Wehnelt voltage of say −101 kv. is fed to the secondary coil of the impulse-insulating-transformer 2 through the insulating attachment and reaches the Wehnelt cylinder 6 directly from there.

A grounded device 46 serves to produce the control impulses. The control impulses produced by the device 46 are fed to the primary winding of the impulse-insulating-transformer 2. This winding is also at ground potential. The secondary winding of the insulating transformer 2 is insulated from the primary winding with suitable high tension insulating and is at high-voltage potential. The transformer 2 is a step-up transformer, serving to convert the pulses fed to the primary winding to the high-tension potential of the beam-producing system.

The arrangement is made in such a manner that the beam-producing system (5, 6, 7) is at first locked, i.e. that no electron beam can leave the anode 7 as long as the pulse generating device 46 does not operate. This result is obtained in that the Wehnelt cylinder 6 is biased with a negative potential with respect to the cathode 5, for example 1 kv. more negative. If the pulse generating device 46 switched on the Wehnelt cylinder is supplied with high potential positive pulses which reduce the Wehnelt negative bias so far that an electron beam can leave the anode 7. Immediately upon termination of each control impulse this electron beam is blocked.

Underneath the anode 7 as seen in the direction of the beam a diaphragm 8 is arranged which can be moved in the plane of the paper and perpendicular to the plane of the paper by means of the knobs 9 and 10.

After the electron beam has been adjusted by displacement of the diaphragm 8 the beam passes through a grounded tube 15 and is focussed at the work piece to be welded 26, 27 by means of an electromagnetic lens 20. The upper pole shoes of the electromagnetic lens 20 are designated by 21 while the lower pole shoes carry the designation 22. Current for establishment of the suitable field is supplied by source 43.

Underneath the electromagnetic lens 20 a deflecting system 23 is arranged which serves the purpose of moving the electron beam 25. In a device 51 the adjustable deflecting currents are generated which serve to supply the deflecting system 23.

The deflecting system 23 consists of four coils each fitted with a ferro-magnetic core which are arranged in a plane perpendicular to the direction of the beams. The electron beam 25 passes through the aperture of the deflecting system 23 within which the deflecting fields are built up.

For the purpose of observing the welding process there serves an optical system which permits of the microscopic top illumination of the work piece 26, 27. This system consists of an illuminating system 12 which supplies light focussed in parallel rays. This light is reflected by way of two metallic prisms 13 and 14 through perforations 52, 53 in a mirror 16 onto an axially displaceable lens 17 and is focussed by the lens onto the work piece. Underneath the lens 17 an interchangeable glass plate 18 is arranged which protects the lens 17 from possible contamination by metal vapours. The lens 17 is moved in axial direction by a knob 19 and the associated gear drive. The light reflected by the surface of the work piece 26, 27 is aligned in parallel by the lens 17 and is directed by way of the mirror 16 into an observation system 49, comprising as a stereomicroscope. (See FIG. 2.) The microscope 49 is of a structure known per se only its objective is replaced by the lens 17. The microscope is provided with a magnifying changer 50 which permits observation of the surface of the work piece in various enlargements.

In order to avoid harmful radiation entering the eye of the observer, it is advisable to provide protective filters in the path of the light. These filters may be arranged in the wall of housing 11 and may consist, e.g., of a radiopaque glass.

The entire instrument is fitted with a conducting wall 11 and is grounded.

The electron beam 25 leaves the housing 11 through the aperture of the deflecting system 23 and enters the treatment chamber 24. This chamber is also fitted with a conducting envelope and is grounded. In the chamber 24 the work piece to be treated is arranged on a cross slide which permits movement of the object in two coordinate directions perpendicular to one another.

Electron-beam devices operating above 15,000 v. produce X-radiation. In order to protect the operator a properly constructed lead shield of adequate thickness is arranged in the treatment chamber. (This lead shield is not shown in FIG. 1.)

FIG. 1 shows two plates 26 and 27 in the treatment chamber 24 which are to be welded together. In this case, therefore, a butt weld is to be formed.

The metal plates 26 and 27 are held in position by means of a clamping table 28, which in turn is mounted on a table 29. Table 29 is arranged on another table 30 which can be displaced in the plane of the paper. A table 31 serves to support the entire cross slide.

Upon the table 30 two pulleys 32 are arranged wherein one of the pulleys lies before and the other behind the plane of the drawing. One of the pulleys 32 is connected to a cogwheel by means of a spindle passing through the table 30.

The said cogwheel meshes with a worm having one common spindle with the gear wheel 33. The gear wheel 33 meshes with a further cogwheel 34 extended in the direction of its axis which can be rotated by means of a hand wheel 35.

Upon the table 31 there are arranged two further pulleys 42 connected to each other by a cord drive. The spindle of the left-hand pulley 42 passes through the table 31. Upon the spindle of the said pulley 42 a bevel gear is arranged which forms a right-angle drive 41 together with a further bevel gear. A hand wheel 40 serves to operate the drive 41.

The mode of operation of the device for moving the cross slide is as follows. By rotation of the hand wheel 40 the left-hand pulley 42 is turned by the gear drive 41. By the cord drive connecting the two pulleys the other pulley 42 is also rotated. In one place the table 30 is attached to the cord drive so that it is moved from left to right or vice versa when the hand wheel 40 is rotated. During this movement the gear wheel 33 slides along the cogwheel 34. If now the cross slide has been laterally adjusted more particularly in such a way that the seam betwen the metal sheets 26 and 27 lies at the point of incidence of the electron beam 25 then by the operation of the hand wheel 35 the cross slide is shifted perpendicular to the plane of the drawing. By rotation of the hand wheel 35 the cogwheel 34 is turned. The gear wheel 33 in mesh with the said cogwheel 34 is also turned and drives by the worm and the wormwheel meshing with it the two pulleys 32 which are also connected by a cord drive. The table 29 is attached to the cord drive at one place so that, therefore, upon operation of the hand wheel 35 the table 29 can be shifted forwards and backwards.

The metal sheets 26 and 27 to be welded together are positioned on the table 29 in such a way that the seam between them runs accurately in the direction of the movement of the table 29. When this is the case and the lateral adjustment has been performed by means of the hand wheel 40 the electron beam 25 may be switched on. This beam impinges upon the metal sheets 26 and 27 to be welded together and melts a marginal zone on either side of the seam. The molten and overheated material flows into the seam and in the intervals betwen the impulses this material cools to a desired temperature value. Thereby it is avoided that the metal sheets 26 and 27 are greatly heated in the vicinity of the welding point. Experiments have shown that in the performance of the welding process the metal sheets will not become incandescent. The welding seam alone glows brightly since here the metal is molten and overheated.

A motor drive is provided to produce uniform table motion in the direction of the seam. The motor drive comprises the electric motor 38 which drives a wheel 36 by way of a reduction gear box 37. By the wheel 36 is driven the hand wheel 35 so that there is a continuous motion of the cross slide in the direction of the welding seam when the motor 38 is switched on. The rotational speed of the motor 38 is controlled by a speed regulator 39.

The table 29 of the cross slide is preferably equipped with end-position switches. Said end-position switches are not shown in FIG. 1. In the usual arrangement the limit switches are connected in such a manner that the direction of rotation of the electric motor 38 is automatically reversed after operation of an end-position switch.

The treatment chamber 24 is provided with an aperture 47 to which a pumping device represented schematically by the pump 48 is connected. By means of this pumping device both the treatment chamber 24 and the housing 11 are kept at a high vacuum during the working procedure.

For the purpose of producing the electron beam impulses the voltage of the Wehnelt cylinder 6 is controlled. The voltage relations at the beam-producing system are more particularly explained in connection with FIG. 3.

The ordinates in this figure represent voltage values while the abscissa indicates the time.

The voltage existing at the cathode 5 is designated by 54. 57 designates the bias voltage applied to the Wehnelt cylinder. By 56 the blocking voltage of the beam-producing system is designated i.e. all voltages applied to the Wehnelt cylinder 6 which lie below the line 56 can not trigger off the electron beam 25.

If the impulse generating device 46 is switched on control impulses 58 at high voltage potential are applied to the Wehnelt cylinder 6. Within the duration of these impulses the Wehnelt cylinder voltage is raised to the working voltage designated by 55. The beam current flowing within the duration of the impulse is proportional to the voltage value attained between the lines 55 and 56. If by suitable adjustment of the device 44 the direct voltage at the Wehnelt cylinder 6 is raised then while the amplitude of the control impulses remains constant the beam current of the electron beam 25 is also raised. These relations can be clearly seen in FIG. 3. As is shown in this figure the peaks of the control impulses project above the line designated by 55 upon increase of the Wehnelt cylinder voltage to a value designated by 59. In this case the beam current of the electron beam is proportional to the value between the impulse peaks and the line 56.

As explained by this discussion the amplitude of the electron beam pulses can, therefore, be varied by changes in the Wehnelt cylinder voltage.

In FIG. 4 there is designated by 61 a work piece represented at high magnification to which a further work piece is attached. To produce an attaching weld the electron beam 25 is directed upon the place of the seam. Thereby the temperature distribution designated by 62 is produced at the said place. It can be seen from the curve 62 that the seam itself and a very narrow border zone in the neighbourhood of the seam are molten. By $T_S$ in FIG. 4 there is designated the melting point temperature of the material to be treated. The curve 62 does not correspond to reality in so far as its peak should lie far higher still than the value $T_S$. For reasons of space economy, however, a true-to-scale representation of the curve 62 in FIG. 4 has been abandoned.

If the electron beam pulse is switched off the molten material after flowing into the seam and penetrating into the capillaries and the pores of the two work pieces cools strongly by heat conduction towards the parts of the material adjacent the seam. The resulting temperature distribution before the start of a new pulse is designated by 63 in FIG. 4. As can be seen from this curve the seam has cooled below the melting point temperature $T_S$ and the temperature of the work pieces has reached an average value.

During the welding process the work pieces 60 and 61 are moved in the direction of the seam perpendicular to the plane of the drawing while the electron beam remains stationary.

In FIG. 5 an attachment weld produced by the new method is represented as a metallurgical section image. As can be seen from this figure the two work pieces have by the welding process been melted together to one uniform work piece 64. A seam can no longer be recognized in the metallurgical section.

Figure 7:
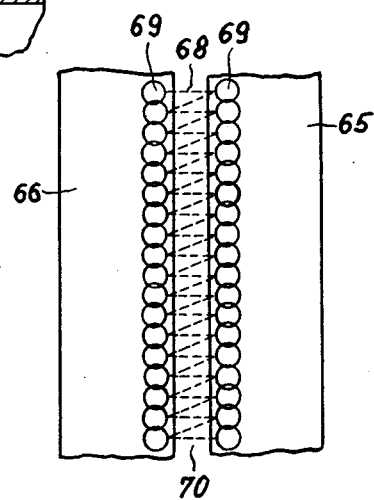
FIG. 7 shows the path of the electron beam along a welding seam.

In FIGURES 6 and 7 the path taken by the electron beam 25 when producing a butt weld can be seen. The two work pieces 65 and 66 are to be welded together. For this purpose the work pieces are moved in the direction of the seam by means of the driving device of the cross slide while the electron beam 25 is simultaneously moved in the way represented in FIG. 7 by means of the deflecting system 23. This can be obtained by applying a saw-tooth-shaped voltage impulse to two opposing coils of the deflecting system 23. By the superimposition of the motion of the electron beam and of the movement of the work pieces the electron beam is made to follow the path designated by 68 in FIG. 7. The places of incidence of an electron beam impulse are therein designated by 69 throughout.

By the incidence of the electron beam impulses the regions of the material lying on either side of the seam 70 are melted wherein the temperature distribution curve designated by 67 in FIG. 6 results. (This curve also is not true to scale with respect to its peak above the value $T_S$.) The molten material in this case flows into the seam.

With the method according to the invention it is possible to weld such materials as zerconium and tantalum wherein the requirements for extreme purity of the weld are satisfied without special measures.

A further advantage of the new method lies in the fact that with it a welding speed can be attained which lies above the welding speed attainable with the welding methods of prior art. It is for instance possible without special measures to obtain welding speeds of 10 to 17 mm./sc. and more.

With the device according to the invention it is possible to focus the electron beam to a beam area of 20 to 30μ diameter. With a beam covering this area it is possible to weld together even very thin metal sheets without special measures. If thicker metal sheets are to be welded together it may be advantageous to choose a greater beam area which is easily possible with the device according to the invention by a slight defocussing of the electron beam.

For the production of V-shaped seams it is advantageous to use first a sharply focussed electron beam and to produce a weld running along the bottom of the seam. There upon the effective beam area is enlarged by a slight defocussing or beam deflection perpendicular to the seam and this beam is again run along the seam. In this way it is obtained that a seam of the said kind is entirely filled by material.

In the production of minor welds it may be advantageous to limit movement of the objects to be treated and to substitute for the said movement a deflection of the electron beam. It is for instance possible to produce circular welding seams without moving the objects by deflecting the electron beam in a circular path.

Owing to the possibility of deflecting the electron beam it is possible to produce welded seams in places difficult of access such as for instance the inside of tubes. For this purpose it is necessary to deflect the electron beam 25 in suitable manner.

By using two or more electron beam sources and the corresponding number of focussing and deflecting systems it is possible to produce simultaneously several welded seams in a single operation.

In FIG. 8 there is represented a device by means of which it becomes possible to discharge the treated objects from the high vacuum and to introduce new objects without disturbing the high vacuum in the device. For said purpose two additional chambers 71 and 73 provided with respective pump connections 72 and 73 are laterally connected to the treatment chamber 24. For the purpose of sealing said chambers with respect to the treatment chamber 24 there serve the hinged doors 75 and 77. For the purpose of sealing said chambers 71 and 73 against external pressure there serve the similarly hinged doors 76 and 78. The chambers 71 and 73 contain movable cars 79 and 81 which can be moved towards the treatment chamber 24 and away from same by means of electric motors not here represented.

The mode of operation of the device represented in FIG. 8 is as follows. After the treatment of an object is performed the table 29 is moved into an end position. After this end position has been reached, the motor 38 is switched off either automatically or manually, whereupon the trap door 77 is opened and the car 81 is moved towards the treatment chamber 24. Thereupon the object 26 together with the clamping device 28 is transported onto the car 81 by means of a suitable conveying mechanism not here represented. Said car then runs in the direction of the door 78, the door 77 is closed, and the table 29 moves to the right end position. Thereupon the trap door 75 is opened, the car 79 is moved to the left and a new object is transported onto the table 29 by means of another conveying device not here represented. The car 79 then moves to the right, the door 75 is closed and after proper adjustment has been made a new welding process can take place.

The treated objects may be removed from the chamber 73 by opening the door 78, while the objects to be treated are introduced into the chamber 71 after opening the door 76. The device may alternatively be made in such a way that several objects are accommodated in the chambers 71 and 73.

In order to be able to carry out weldings in which either a protective gas is present or a gaseous material for admixing is to be conveyed to the weld, the device represented in FIG. 9 is used. As can be seen in this figure an electromagnetic lens 82 is so developed that a sealed off chamber 86 is formed between its upper pole shoes 83 and its lower pole shoes 84. This chamber is provided with a connection 87 to which is connected a vacuum pump not here represented. The lower pole shoes 84 carry a narrow little tube 85, the cross section of which hampers the penetration of gas into the chamber 86, but does not prevent the passage of the electron beam. Underneath the chamber 86 is another chamber 88 which is in communication with a further vacuum pump by way of a connecting piece 89. Another chamber 90, which is also connected to a vacuum pump by way of a connecting piece 81, is arranged underneath the chamber 88. Underneath the chamber 90 a deflecting system 23 is arranged just as it is represented in FIG. 1.

The treatment chamber 24 is connected to a vessel 93 which feeds gas to the chamber 24 by way of a needle valve 94. The excess gas or the reaction product originating is withdrawn by means of a pump connected to a connecting piece 92. By means of the device represented in FIG. 9 it is possible to maintain a higher pressure within the treatment chamber 24 in a manner fundamentally of prior art without disturbing the high vacuum required within the chamber 11. For this purpose more and more reduced pressures are maintained in the chambers 90, 88 and 86.

Figure 10:
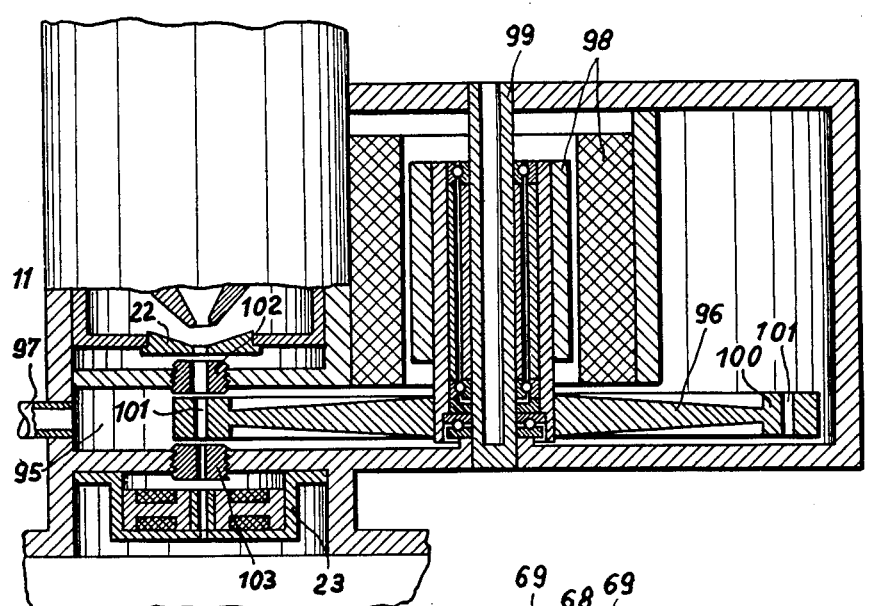
FIG. 10 shows a partial view of a device for welding or soldering by means of a beam of charged particles with the use of an intermediate-pressure chamber containing a moveable diaphragm shown in part section.

The device represented in FIG. 10 serves the same purpose as the device of FIG. 9. In this case an intermediate pressure chamber 95 is arranged between the treatment chamber 24 and the beam generating chamber 11 and the said chamber is connected to a vacuum pump by way of a connecting piece 97. The chamber 95 contains a disc 96 which is rotated about shaft 99 by means of an electric motor 98. The disc 96 is provided with an annular ring 100 which contains holes 101. Said holes are so moved between the apertures 102 and 103 at such a speed that the time required by gas molecules entering one of the apertures 101 from the chamber 24 in order to reach the aperture 102 is longer than the time during which the apertures 101, 102, 103 are connected. During every closure of the communication 101, 102, 103 the gas which has penetrated into the apertures 101 is sucked off through 97.

The device also provides for a control device (not here represented), which switches on the electron beam as soon as the connection 101, 102, 103 is established and which switches off the beam as soon as this connection is interrupted.

The new device for welding or soldering has been described in connection with the use of electron beams. It is, however, also possible to use other beams of charged particles such as e.g. ionic beams instead of the electron beam.

We claim:

1. The method of welding and soldering adjacent materials separated by a gap which comprises focussing the beam on the material to be welded and interrupting said beam intermittently so as to form beam pulses, wherein the energy density impinging on the material during said pulses is sufficient to melt the material of the impinged area and to overheat the molten material to thermally expand the material into the gap and to provide the material with sufficient heat energy to remain molten as it flows in the gap and fuses to the adjacent materials, and the duration of the intervals between successive pulses is so selected that the molten material cools to a predetermined temperature value during each of said intervals, the duration of the beam pulses being $10^{-3}$ to $10^{-6}$ seconds and the ratio of the duration of the interval to the duration of the pulse being at least 5:1.

2. The method according to claim 1 in which the materials to be welded are separated by a groove having a transverse dimension as great as or greater than the cross section of the beam, which includes moving said materials in the direction of said groove and periodically deflecting the beam transversely to the direction of the groove to such an extent that it impinges upon a narrow marginal zone about the weld seam.

3. The method according to claim 1 in which for producing a closed weld seam the duration of the pulses or the pulse-recurrence frequency are varied in such a way that more energy is delivered to the material at the beginning than at the end of the weld seam.

4. The method of welding and soldering according to claim 1 in which the gap separating the adjacent materials is large in the direction of the beam and which includes the additional step of moving the pulsating beam along the welding seam in repetitive passes and varying the focussing of the beam during each of said passes.

References Cited in the file of this patent

UNITED STATES PATENTS

| | | |
|---|---|---|
| 2,746,420 | Steigerwald | May 22, 1956 |
| 2,778,926 | Schneider | Jan. 22, 1957 |
| 2,793,281 | Steigerwald | May 21, 1957 |
| 2,824,232 | Steigerwald | Feb. 18, 1958 |
| 2,932,720 | Stohr | Apr. 12, 1960 |

FOREIGN PATENTS

| | | |
|---|---|---|
| 1,141,535 | France | Mar. 18, 1957 |